United States Patent [19]

Darwood

[11] E Re. 29,733

[45] Reissued Aug. 15, 1978

[54] TELEPHONE ANSWERING APPARATUS

[75] Inventor: James R. Darwood, Anaheim, Calif.

[73] Assignee: T.A.D. Avanti, Inc., Paramount, Calif.

[21] Appl. No.: 765,546

[22] Filed: Feb. 4, 1977

Related U.S. Patent Documents

Reissue of:

[64] Patent No.: 3,968,329
Issued: Jul. 6, 1976
Appl. No.: 548,413
Filed: Feb. 10, 1975

[51] Int. Cl.[2] ..... G11B 15/68; G11B 5/54

[52] U.S. Cl. ..... 179/6 R; 360/92

[58] Field of Search ..... 179/6 R, 6 E; 360/89, 360/92, 93, 96; 242/201, 200

[56] References Cited

U.S. PATENT DOCUMENTS

| | | | |
|---|---|---|---|
| 3,008,012 | 11/1961 | Proctor | 360/96 |
| 3,115,597 | 12/1963 | Salzberg et al. | 179/6 R |
| 3,715,504 | 2/1973 | Piott | 360/74 |
| 3,721,765 | 3/1973 | Ho | 179/6 R |
| 3,759,529 | 9/1973 | Yoshii | 360/96 |
| 3,833,186 | 9/1974 | Catto et al. | 179/6 R |
| 3,860,963 | 1/1975 | Veda | 179/6 R |
| 3,893,186 | 7/1975 | Yoshii | 360/96 |
| 3,904,826 | 9/1975 | Murata et al. | 179/6 E |

*Primary Examiner*—Vincent P. Canney
*Attorney, Agent, or Firm*—Keith D. Beecher

[57] ABSTRACT

Telephone answering apparatus is provided which is simple in its construction as compared with the usual prior art apparatus, but which is capable of performing all of the operations performed by the more complex prior art apparatus, and also of performing operations beyond the capabilities of the usual prior art apparatus. The apparatus of the invention utilizes a cassette-type tape unit on which announcement messages may be recorded, for transmission to a calling party during an initial time interval ($T_1$). The apparatus also includes a cassette-type tape unit to record the messages from the calling party during a subsequent message recording interval ($T_2$). In the apparatus, a single irreversible drive motor is used for both the announcement and message tape units, and a simple mechanical drive is provided for the message tape unit for driving the message tape unit in one direction during a fast forward operation, and for driving the message tape unit in the opposite direction during a rewind operation, without the need for reversing the direction of rotation of the drive motor.

6 Claims, 3 Drawing Figures

TELEPHONE ANSWERING APPARATUS

Matter enclosed in heavy brackets [ ] appears in the original patent but forms no part of this reissue specification; matter printed in italics indicates the additions made by reissue.

BACKGROUND OF THE INVENTION

Telephone answering apparatus in general is well known in the prior art. Such apparatus responds to an incoming telephone ring signal to transmit a recorded announcement to the calling party during a first time interval ($T_1$), and then automatically to enter a message recording mode during a second time interval ($T_2$) during which the message from the calling party is recorded. A first type of the prior art telephone answering apparatus is constructed so that the second time interval ($T_2$) is of a fixed length, and others are constructed so that the second time interval ($T_2$) continues so long as the calling party is talking.

The prior art telephone answering apparatus, for the most part is complex in its construction, and incorporates complicated relay circuits involving a multiplicity of mechanical relays, in order to achieve the required switching functions. The prior art apparatus also generally involves relatively complicated controls and other electronic circuits. A simplified type of telephone answering apparatus is described and claimed in copending application Ser. No. 481,966 which was filed June 24, 1974 in the name of the present inventor, and which is assigned to the present assignee. The telephone answering apparatus described in the copending application is constructed to retain all the basic features and functions of the prior art systems and apparatus, and yet to involve a relatively simple and inexpensive assembly, and to include relatively simple electronic controls and circuitry.

The apparatus of the present invention is generally similar to the apparatus described in the copending application. However, in the apparatus of the present invention the announcement tape is embodied in a cassette-type unit, rather than being permanently incorporated into the apparatus, as is the case in the prior application. Also, in the apparatus of the present invention a single irreversible drive motor which is used to drive both the announcement and message tape units, instead of reversing the direction of rotation of the motor for the rewind operation of the message tape unit, as is the case in the apparatus described in the copending application, reversal is achieved through a mechanical coupling assembly, which will be described. Such a construction permits one of the motor leads to be connected to a grounded noise shield, to reduce motor noise in the reproduced signals during the playback operation. It is not feasible to ground one of the motor leads in the apparatus of the prior application, so that noise attenuation cannot easily be achieved in the reversible type motor apparatus.

DETAILED DESCRIPTION OF THE ILLUSTRATED EMBODIMENT

Figure 1:
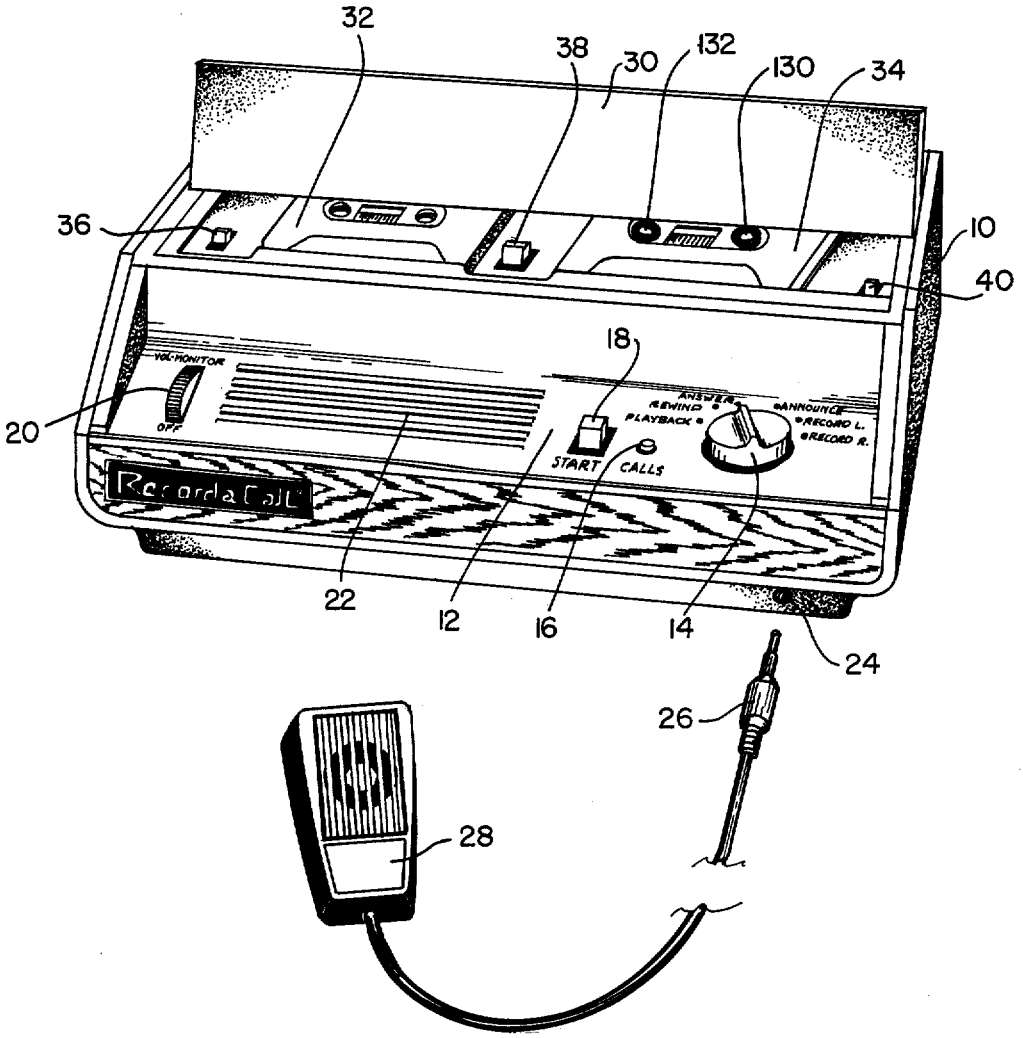
FIG. 1 is a perspective representation of a telephone answering instrument which may incorporate the improved and simplified apparatus of the present invention.

The telephone answering apparatus shown in FIG. 1 is constructed for direct use in conjunction with the telephone line, and it may be plugged into a usual telephone jack by an appropriate telephone connecting cord or cable. The apparatus is energized from the usual domestic alternating current receptacle, and a typical power cord is also provided for plugging the unit into the receptacle. The apparatus shown in FIG. 1. includes a casing 10 having a control panel 12 extending along its forward edge. A control knob 14 is rotatably mounted on the control panel 12, and it controls a rotary switch. The rotary switch may be set to six different positions, indicated respectively as "Playback," "Rewind," "Answer," "Announce," "Record L," and "Record R."

A call light 16 is mounted on the control panel 12, and this call light is illuminated whenever a call is received by the instrument. A start button 18 is also mounted on the control panel which, when depressed, operates a switch to place the apparatus in operation, just as if a telephone call were received. Also, a combined on-off power switch and volume control 20 is mounted on the control panel. The instrument includes a speaker which is mounted behind a grill 22 on the panel 12, and it also includes a microphone jack 24 which receives the plug 26 of a microphone 28.

The top of the casing 10 has a hinged lid 30 which may be opened to permit access to a pair of cassette-type tape units designated 32 and 34. The cassette tape unit 32 contains a loop of magnetic tape which bears the recorded announcement which is transmitted to the calling parties during the first time intervals ($T_1$) after each call is received. The cassette tape unit 34 contains a reel of magnetic tape which is drawn onto a take-up reel to record the messages from the calling parties which are received during the following time intervals ($T_2$).

A lever 36 is provided which permits the removal of the announcement cassette 32. An erase lever 38 is provided which, when operated during the rewind mode of the tape in the message cassette 34, serves to erase the previous messages on the tape in the message cassette. A fast forward lever 40 is also provided which imparts a fast forward motion to the tape in the message cassette 34.

When the control knob 14 is turned to the Answer position, the telephone answering instrument is then set to answer incoming phone calls automatically, and to transmit the announcement on the announcement tape in cassette 32 during the time intervals ($T_1$), and subsequently to record the messages from the calling parties on the message tape in cassette 34 during the following time intervals ($T_2$). When the control knob 14 is turned to the Rewind position, the message tape in cassette 34 is rewound to its origin position. If the control knob 14 is turned to the Playback position, the message tape in the cassette 34 will move in the forward direction so that the messages previously recorded on the tape may be reproduced through the speaker behind the grill 22. Whenever a call is received by the unit, the call light 16 is illuminated, so that the operator may return the message tape to the origin position, and then play back the messages which have been received and recorded on the message tape in the cassette 34. When the control knob 14 is turned to the Announce position, the telephone answering instrument will answer the telephone and will transmit the announcement on the announcement tape in cassette 32 to the calling party, but will not record any incoming messages.

Any desired announcement may be recorded on the announcement tape in cassette 32 by turning the control knob 14 to the Record L position, by plugging the plug 26 into the microphone jack 24, and by speaking into the microphone 28. Likewise, the instrument may be used as a dictating machine, or for other recording purposes, by setting the control knob 14 to the Record R position, and by recording dictation, or other information on the message tape in cassette 34 through the microphone 28. This latter setting of the control knob 14 also permits the operator to record two-way conversations received over the telephone.

Figure 2:
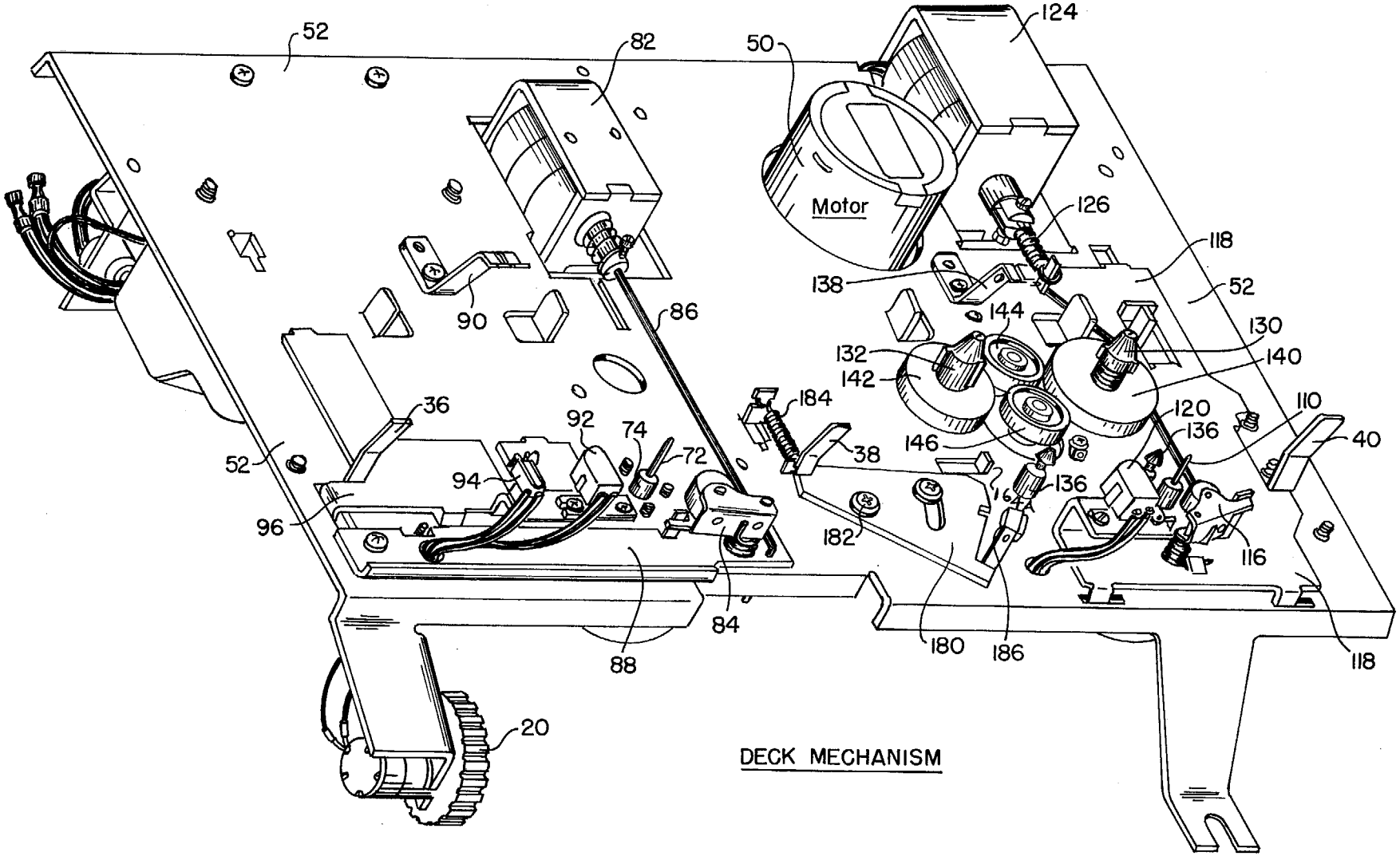
FIG. 2 is a perspective representative of the internal chassis of the instrument of FIG. 1, and various components which are supported on the chassis.
Figure 3:
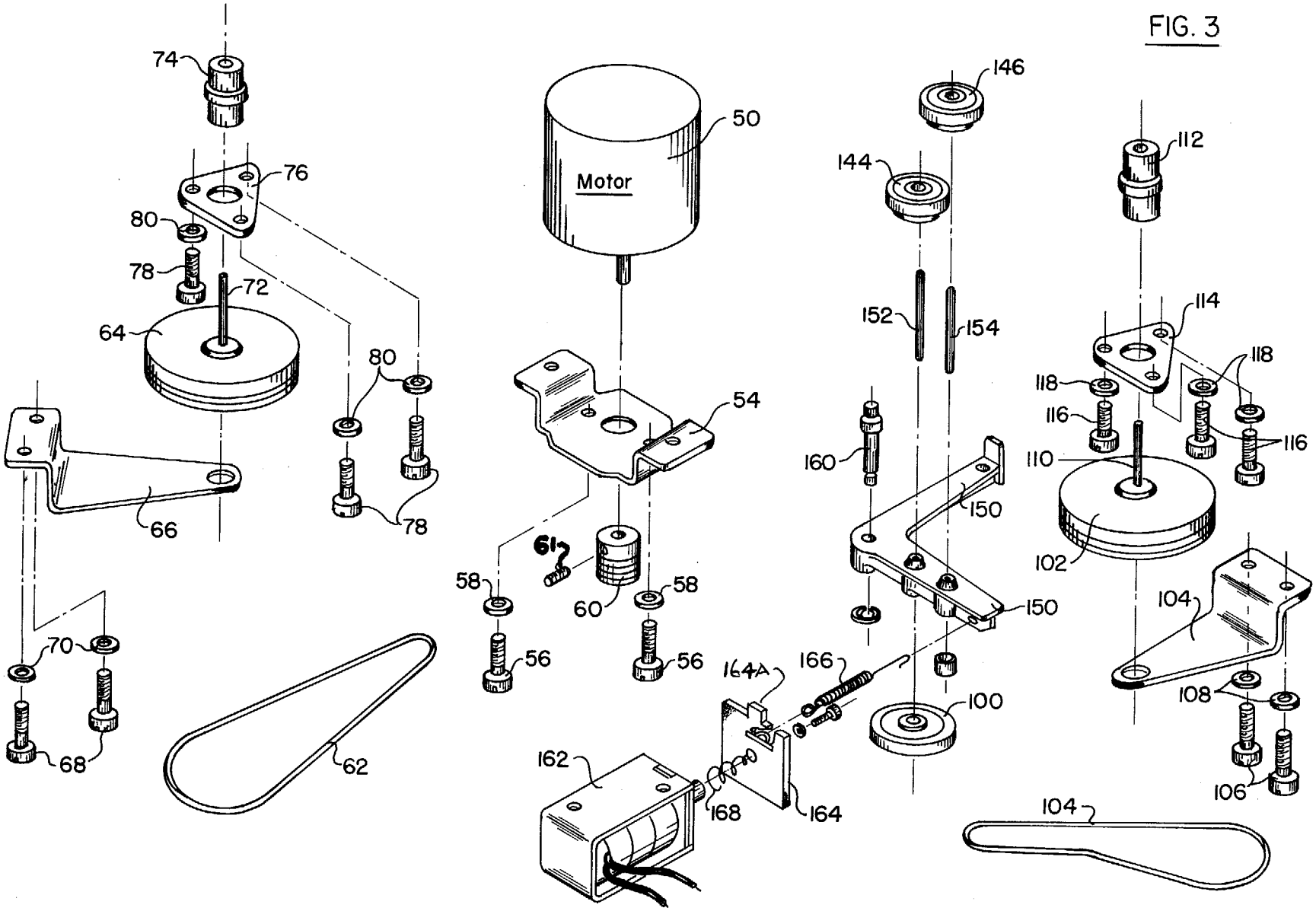
FIG. 3 is an exploded representation of additional components which are supported on the underside of the chassis of FIG. 2.

As shown in FIGS. 2 and 3, for example, the apparatus includes a motor 50 which may, for example, be any suitable direct current motor. The motor 50 is mounted on the chassis 52 by means, for example, of a bracket 54 (FIG. 3) which is secured to the underside of the chassis by screws 56 which engage spring washers 58. A pulley 60 is mounted on the motor shaft by means, for example, of a set screw 61.

The pulley 60 is coupled through a rubber belt 62 to a flywheel 64. The flywheel 64 is secured to the underside of the chassis 50 by means of a bracket 66, the bracket being mounted by screws 68 which engage spring washers 70. A capstan pin 72 extends upwardly from the pulley 64 through a bearing 74, the bearing being mounted in the chassis 50 by a mounting plate 76, the mounting plate being held to the underside of the chassis by three screws 78 and corresponding spring washers 80.

As shown in FIG. 2, a solenoid 82 is mounted on the chassis 52, and it is coupled to a pinch roller assembly 84 through a pull rod 86. The pinch roller assembly 84 is mounted on a movable plate 88 which is normally biased to a standby position. However, when the solenoid 82 is energized, the pull rod 86 pulls the plate 88 and the pinch roller assembly 84 into an operative position to pinch the announcement tape in the cassette 32 of FIG. 1 against the drive capstan 72. In this way, the announcement tape in cassette 32 is driven whenever the solenoid 82 is operated.

The announcement cassette 32 is held in place on the chassis 52 by means of a hold down clip 90, with its tape engaging an electromagnetic transducer head 92 and an electric switch 94, the head 92 and switch 94 being mounted on a spring biased head plate 96, so that the head and switch are urged into engagement with the announcement tape as the tape is moved by the drive capstan 72. The announcement tape is in the form of a loop, as mentioned above, so that each time the solenoid 82 is energized the announcement tape continues to run through the complete loop, at which time the switch 94 is operated to cause the solenoid to be de-energized. The announcement cassette 32 may be removed by operating the lever 36 to move the plate 96 and shift the switch 94 and head 92 away from the tape, against the spring bias of the plate.

The drive motor 50 is also coupled to a drive pulley 100 and to a flywheel 102 through a second rubber belt 104. The flywheel 102 is mounted on the underside of the chassis 52 by means of a bracket 104 which is held in place by mounting screws 106 in conjunction with spring washers 108. The flywheel 102 drives a capstan 110 which is supported in a bearing 112. The bearing 112 is mounted in a mounting plate 114 which, in turn, is fastened to the underside of the chassis 52 by three mounting screws 106 in conjunction with corresponding spring washers 118.

A pinch roller assembly 116 is mounted on a spring biased plate 118, and an electromagnetic transducer head 120 is also mounted on the plate. The pinch roller 116 is normally spaced from the drive capstan 110 until a solenoid 124 is energized. The solenoid 124 is coupled to the plate 118 through a spring 126. When the solenoid is energized it pulls the plate to the left in FIG. 2 to cause the pinch roller 116 to pinch the tape in the cassette 34 of FIG. 1 against the drive capstan 110, so that the tape is drawn from the feed reel to the take-up reel in the cassette. At the same time, the head 120 is moved against the tape for recording or playing back the information on the tape.

A take-up drive spindle 130 is rotatably mounted on the chassis 52, as is a feed spindle 132. When the cassette 34 is inserted into the apparatus, the spindle 130 engages the take-up reel in the cassette and the spindle 132 engages the feed reel. The cassette is held in place by positining pins 136, and by a hold down clip 138. A drive wheel 140 is mounted coaxially with the take-up spindle 130, and a corresponding drive wheel 142 is mounted coaxial with the spindle 132. A pair of drive wheels 144 and 146 are mounted on an arm 150 (FIG. 3) between the drive wheels 140 and 142. The wheels 144 and 146 are rotatably mounted on the arm 150 by respective shafts 152 and 154.

The wheels 144 and 146 engage one another, so that when one of the wheels is driven, the other wheel also turns. The wheel 144 is driven by the pulley 100 through the shaft 152 when the motor 50 is energized. Appropriate spring biasing means may be provided to hold the wheel 144 and 146 in engagement with one another. Also, the shaft 154 may be mounted in a slot in the arm 150 to exhibit limited radial movement with respect, for example, to the take-up drive wheel 140 to prevent the wheel 146 from exerting any force on the wheel 140.

The arm 150 is pivotally mounted on the underside of the chassis 52 by means of a shaft 160. A solenoid 162 is coupled to the arm through a plate 164 which, in turn, is coupled to the arm through a spring 166. The plate 164 is normally biased to the right in FIG. 3 by a spring 168, so that the arm 150 is turned in a counter clockwise direction on the shaft 160 to move the wheel 144 against the take-up wheel 140 so as to drive the message tape in the cassette 34 in the forward direction at a relatively high speed when the lever 40 of FIGS. 1 and 2 is manually operated to move the pinch roller assembly 116 and head 120 out of engagement with the message tape in the cassette 34. However, when the solenoid 162 is energized, and the solenoid 124 is de-energized, by placing the control knob 14 to the Rewind position, the plate 164 is drawn to the left in FIG. 3, and the arm 150 is turned in a clockwise direction so that wheel 146 is drawn against the wheel 132. The wheel 146 is turned by the wheel 144, and wheel 146 drives wheel 132 in the proper direction to cause the message tape in the cassette 34 to be rewound on the feed reel, likewise, at a relatively high speed.

During the rewind operation, but prior to the energization of solenoid 124, the lever 38 may be operated manually to turn a pivotally mounted plate 180 about its pivot shaft 182, and against the force of a spring 184 so as to bring a permanent magnet 186 into engagement with the tape. The projection 164A on plate 164 then interlocks with a notch on plate 180, so that the tape may be erased during the rewind operation, if so desired. However, if the solenoid 124 is energized prior to the actuation of lever 38, the projection 164A prevents the pivotal movement of the plate 180 to obviate accidental erasure during rewind.

The invention provides, therefore, improved telephone answering apparatus in which both the announcement and the calling parties are recorded on removable cassettes. The recording of the announcement on a removable cassette increases the flexibility of use of the apparatus, since it permits the user to establish a library of different announcements for different occasions, and in that it permits him to insert a particular announcement cassette into the apparatus, whenever desired. Also, the apparatus includes a mechanical reversing mechanism for the message tape, which permits the use of an irreversible electric motor to drive all the components, so that appropriate shielding may be effectuated to prevent motor noises from entering the reproduced signals.

While a particular embodiment of the invention has been shown and described, modifications may be made. It is intended in the claims to cover the modifications which come within the spirit and scope of the invention.

What is claimed is:

[1. A telephone answering apparatus including in combination: means mounted in said apparatus for receiving a removable magnetic announcement tape unit; first capstan drive means mounted in said apparatus on one side of the path of the tape in said removable tape unit for driving the tape; a first pinch roller assembly mounted in said apparatus on the opposite side of the path of said tape; first solenoid means mechanically coupled to said first pinch roller assembly for selectively causing the first pinch roller assembly to be drawn against the tape to move the tape into driving engagement with the first capstan drive means; means mounted in said apparatus for receiving a removable cassette-type magnetic message tape unit; a second capstan drive means mounted in said apparatus on one side of the path of the tape in the message tape unit for driving the message tape; a second pinch roller assembly mounted in said apparatus on the opposite side of the path of the tape in said message tape unit; second solenoid means mechanically coupled to said second pinch roller assembly for selectively moving said second pinch roller assembly toward the second capstan drive means to move the tape in said message tape unit into driving engagement with the capstan drive means; a drive motor mounted in the apparatus and mechanically coupled to the first and second capstan drive means; first and second spindle means mounted in the apparatus for receiving the casette-type message tape unit; mechanical coupling means for selectively coupling the drive motor to the first and second spindle means to drive the tape in the message tape unit selectively in a forward and in a rewind direction; and third solenoid means connected to said coupling means for changing the coupling of the drive motor from one of the spindle means to the other whenever the third solenoid means is energized.]

[2. The telephone answering apparatus defined in claim 1, and which includes a plate slidably mounted in said apparatus between a first position and a second position for supporting said second pinch roller assembly, and which includes electromagnetic transducer means mounted on said plate, said second solenoid means being mechanically coupled to said plate for selectively moving said plate from its first position to its second position to move said second pinch roller assembly and said electromagnetic transducer means into operating relationship with respect to the tape in said message tape unit.]

3. [The telephone answering apparatus defined in claim 2, and which includes] *A telephone answering apparatus including in combination: means mounted in said apparatus for receiving a removable magnetic announcement tape unit; first capstan drive means mounted in said apparatus on one side of the path of the tape in said removable tape unit for driving the tape; a first pinch roller assembly mounted in said apparatus on the opposite side of the path of said tape; first solenoid means mechanically coupled to said first pinch roller assembly for selectively causing the first pinch roller assembly to be drawn against the tape to move the tape into driving engagement with the first capstan drive means; means mounted in said apparatus for receiving a removable cassette-type magnetic message tape in the message tape unit; a second capstan drive means mounted in said apparatus on one side of the path of the tape in the message tape unit for driving the message tape; a second pinch roller assembly mounted in said apparatus on the opposite side of the path of the tape in said message tape unit; second solenoid means mechanicaly coupled to said second pinch roller assembly for selectively moving said second pinch roller assembly toward the second capstan drive means to move the tape in said message tape unit into driving engagement with the capstan drive means; a drive motor mounted in the apparatus and mechanically coupled to the first and second capstan drive means; first and second spindle means mounted in the apparatus for receiving the cassette-type message tape unit; mechanical coupling means for selectively coupling the drive motor to the first and second spindle means to drive the tape in the message tape unit selectively in a forward and in a rewind direction; and third solenoid means connected to said coupling means for changing the coupling of the drive motor from one of the spindle means to the other whenever the third solenoid means is energized, a plate slidably mounted in said apparatus between a first position and a second position for supporting said second pinch roller assembly, and which includes electromagnetic transducer means mounted on said plate, said second solenoid means being mechanically coupled to said plate for selectively moving said plate from its first position to its second position to move said second pinch roller assembly and said electromagnetic transducer means into operating relationship with respect to the tape in said message tape unit,* resilient means coupling said second solenoid means to said plate to permit said plate to be pulled back to its first position, and the pinch roller assembly and electromagnetic transducer means to be pulled back from the tape in said message tape unit, while the second solenoid means is energized.

4. The telephone answering apparatus defined in claim 3, and which includes a second plate slidably mounted in the apparatus adjacent said message tape unit and movable between a first and a second position; magnetic erase means mounted on the second plate; resilient means for normally biasing the magnetic erase means to its first position away from the tape in said message tape unit; and lever means coupled to the second plate for manually moving the second plate from its first position to its second position against the force of the resilient means to bring the erase means into operating relationship with the tape in said message tape unit.

[5. The telephone answering apparatus defined in claim 4, in which the erase means comprises a permanent magnet.]

[6. The telephone answering apparatus defined in claim 4, and which includes means mounted on at least one of the first and second plates for causing the first plate to hold the second plate in its second position upon prior movement of the second plate to its second position, and for causing the first plate to prevent movement of the second plate upon prior movement of the first plate to its second position.]

[7. The telephone answering apparatus defined in claim 1, in which said mechanical coupling means includes an arm pivotally mounted in said apparatus, first and second drive wheels rotatably mounted in said arm in driving engagement with one another; means coupling one of said drive wheels to said drive motor; and means connecting said third solenoid means to said arm to move the arm angularly in one direction and cause one of the drive wheels to engage sid first spindle means when said third solenoid means is de-energized, and to move the arm angularly in the other direction and cause the other of said drive wheels to engage the second spindle means when the third solenoid is energized.]

[8. In combination: apparatus for receiving a removable cassette-type magnetic tape unit including first and second spindle means for driving the magnetic tape in the unit from one reel to another; a drive motor; mechanical coupling means for selectively coupling the drive motor to the first and second spindle means to drive the tape in the unit selectively in a forward and in a rewind direction; and solenoid means connected to said coupling means for changing the coupling of the drive motor from one of the spindle means to the other whenever the third solenoid means is energized.]

[9. The combination defined in claim 8, in which said mechanical coupling means includes a pivotally mounted arm: first and second drive wheels rotatably mounted on said arm in driving engagement with one another; means coupling one of said drive wheels to said drive motor; and means connecting said solenoid means to said arm to move the arm angularly in one direction and cause one of the drive wheels to engage said first spindle means when said solenoid is de-energized, and to move the arm angularly in the other direction and cause the other of said drive wheels to engage the second spindle means when said solenoid means is energized.]

*10. A telephone answering apparatus including in combination: a housing; means mounted in said housing for receiving a removable magnetic announcement tape unit; first capstan drive means mounted in said housing on one side of the path of the tape in said removable tape unit for driving the tape; a first pinch roller assembly mounted in said housing on the opposite side of the path of said tape; first solenoid means mechanically coupled to said first pinch roller assembly for selectively causing the first pinch roller assembly to be drawn against the tape to move the tape into driving engagement with the first capstan drive means; means mounted in said housing for receiving a removable cassette-type magnetic message tape unit; a second capstan drive means mounted in said housing on one side of the path of the tape in the message tape unit for driving the message tape; a second pinch roller assembly mounted in said housing on the opposite side of the path of the tape in said message tape unit; second solenoid means mechanically coupled to said second pinch roller assembly for selectively moving said second pinch roller assembly toward the second capstan drive means to move the tape in said message tape unit into driving engagement with the capstan drive means; a drive motor mounted in the housing and mechanically coupled to the first and second capstan drive means; first and second spindle means mounted in the housing for receiving the cassette-type message tape unit; mechanical coupling means for selectively coupling the drive motor to the first and second spindle means to drive the tape in the message tape unit selectively in a forward and a rewind direction; third solenoid means connected to said coupling means for changing the coupling of the drive motor from one of the spindle means to the other whenever the third solenoid means is energized; a plate slidably mounted in said housing between a first position and a second position for supporting said second pinch roller assembly; electromagnetic transducer means mounted on said plate, said second solenoid means being mechanically coupled to said plate for selectively moving said plate from its first position to its second position to move said second pinch roller assembly and said electromagnetic transducer means into operating relationship with respect to the tape in said message tape unit; resilient means coupling said second solenoid means to said plate to permit said plate to be pulled back to its first position, and the pinch roller assembly and electromagnetic transducer means to be pulled back from the tape in said message tape unit, while the second solenoid means is energized; a second plate slidably mounted in the apparatus adjacent said message tape unit and movable between a first and a second position; magnetic erase means mounted on the second plate; resilient means for normally biasing the magnetic erase means to a first position away from the tape in said message tape unit; lever means coupled to the second plate for manually moving the second plate from its first position to its second position against the force of the resilient means to bring the erase means into operating relationship with the tape in said message tape unit; and means mounted on at least one of the first and second plates for causing the first plate to hold the second plate in its second position upon prior movement of the second plate to its second position, and for causing the first plate to prevent movement of the second plate upon prior movement of the first plate to its second position.*

*11. A telephone answering apparatus including in combination: a housing; means mounted in said housing for receiving a magnetic announcement tape; first capstan drive means mounted in said housing on one side of the tape in said tape unit for driving the tape; a first pinch roller assembly mounted in said housing on the opposite side of the path of said tape; first solenoid means mechanically coupled to said first pinch roller assembly for selectively causing the first pinch roller assembly to be drawn against the tape to move the tape into driving engagement with the first capstan drive means; means mounted in said housing for receiving a magnetic message tape unit, said means including a take-up spindle; drive means coupled to the take-up spindle for causing the message tape to move in a forward direction at a relatively high speed; a second capstan drive means mounted in said apparatus on one side of the path of the tape in the message tape unit for driving the message tape in the message tape unit in the forward direction at a relatively low speed; a second pinch roller*

*assembly mounted in said apparatus on the opposite side of the path of the tape in said message tape unit; second solenoid means mechanically coupled to said second pinch roller assembly for selectively moving said second pinch roller assembly toward the second capstan drive means to move the tape in said message tape unit into driving engagement with the second capstan drive means; a spring-biased plate movably mounted in said apparatus between a first position and a second position for supporting said second pinch roller assembly; electromagnetic transducer means mounted on said plate; and resilient means coupling said second solenoid means to said plate for enabling said second solenoid means selectively to move said plate from its first position to its second position to move said second pinch roller assembly and said electromagnetic transducer means into operating relationship with respect to the tape in said message tape unit; lever means attached to said plate to permit said plate to be pulled back manually to its first position thereby moving the second pinch roller assembly and the electromagnetic transducer means back from the tape in said message tape unit while the second solenoid means is energized to release said pinch roller assembly and to cause the message tape to move in the forward direction at a relatively high speed.*

*12. The telephone answering apparatus defined in claim 11, and which includes a second plate slidably mounted in the housing adjacent said message tape unit and movable between a first and a second position; magnetic erase means mounted on the second plate; resilient means for normally biasing the second plate to its first position in which the magnetic erase means is displaced away from the tape in the message tape unit; and lever means coupled to the second plate for permitting the second plate to be moved manually from its first position to its second position against the force of the resilient means to bring the erase means into operating relationship with the tape in said message tape unit.*

*13. The telephone answering apparatus defined in claim 12, and which includes means preventing movement of said second plate when said second solenoid means is energized.*

* * * * *